March 24, 1953   M. S. RICHARDSON   2,632,883
MAGNETOMETER SYSTEM
Filed July 7, 1944
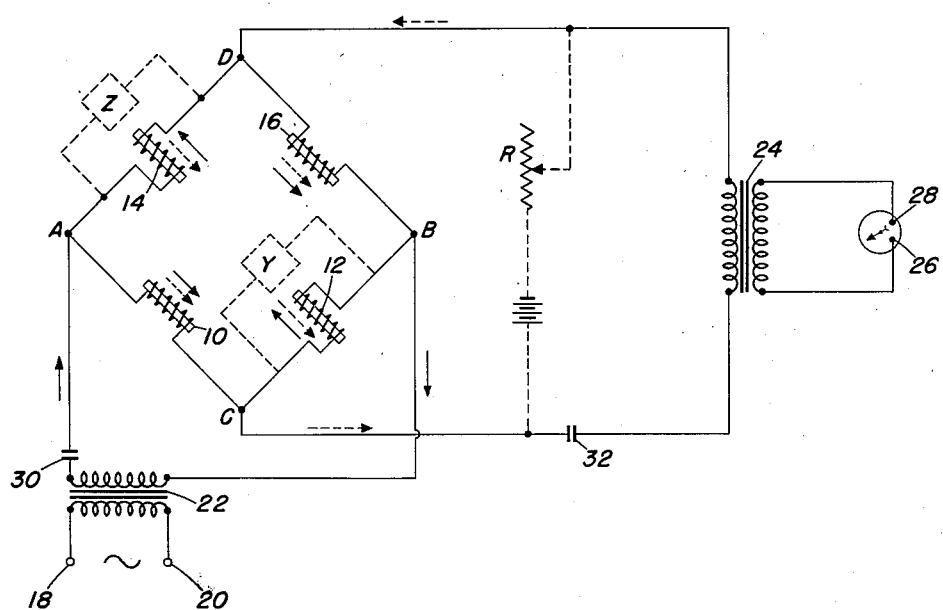
Inventor
MAX S. RICHARDSON Patented Mar. 24, 1953

2,632,883

UNITED STATES PATENT OFFICE 2,632,883

MAGNETOMETER SYSTEM

Max S. Richardson, Summit, N. J., assignor to the United States of America as represented by the Secretary of the Navy Application July 7, 1944, Serial No. 543,923

1 Claim. (Cl. 340—197)

This invention relates to magnetometer systems and more particularly to to sensitive systems for measuring small changes in relatively steady magnetic fields.

Magnetometers for this purpose may comprise, in general, at least one magnetometer element, means for exciting this element and means for detecting changes in the element due to applied fields. In one form, the magnetometer element may include a core of high-permeability magnetic material having one or more coils wound thereon for exciting the core and detecting changes in the magnetization thereof due to applied fields.

Previously used systems embodying magnetometer elements of this type have included those in which two elements were used, each having a single coil which served both to excite the core and to detect changes in its magnetization due to external magnetic fields. The coils of the two elements were connected in series to form two arms of a bridge circuit, the other arms of which comprised either a pair of resistors or the matched halves of a center-tapped transformer secondary winding. Excitation was supplied to this bridge at the junctions between the magnetometer elements and the fixed arms, while the output was taken from the junctions between like arms of the bridge.

In one particular system of this general type, disclosed in copending application Serial No. 516,612, filed January 1, 1944, for Unbalanced Magnetometers, by Otto H. Schmitt, the two magnetometer-element coils were deliberately unbalanced by means of an impedance shunted across one of them to obtain improved characteristics.

In the magnetometer systems just referred to, an applied magnetic field causes a variation in the instantaneous voltage at the junction of the magnetometer coils in respect to the voltage at the junction of the two fixed arms, this latter voltage being considered a reference voltage. The instantaneous output may thus be either positive or negative in respect to the reference voltage depending upon the direction of the applied field. For a system including magnetometer elements of a given size and with a given excitation, a certain output is to be expected for a given change in applied field and the performance of the device is expressed in terms of its sensitivity which is defined as the change in output for a given change in applied field. It is apparent that when such systems are used for measuring relatively small changes in a magnetic field, high sensitivity is very desirable.

It is an object of the present invention to provide a magnetometer system having inherently greater sensitivity than that obtainable with magnetometer systems previously used.

The improved system of the invention includes a bridge circuit in which two pairs of magnetometer-element coils, each pair comprising two coils connected in series, are connected in parallel across a source of excitation. The elements are arranged, mechanically, so that their longitudinal axes are sensibly parallel. The output from the bridge is taken between the points of the bridge which are in each case common to the two coils forming one of the coil pairs mentioned above.

It can be shown that, when the coils of two magnetometer elements are connected in series across a source of excitation as in the two halves of the bridge circuit herein contemplated, the instantaneous voltage at the junction of the coils may be made to increase either in a positive or in a negative sense with applied magnetic fields depending upon the manner in which they are connected.

In the accompanying drawing, the magnetometer-element coils and cores are shown schematically as elements 10, 12, 14 and 16. The coils are wound and connected in a conventional four-arm bridge circuit in the manner shown. Excitation is supplied from a suitable source, as for example an oscillator, to terminals 18 and 20 of transformer 22, the secondary winding of which is connected across the input diagonal of the bridge between points A and B, the junctions of coils 10 and 14 and coils 12 and 16, respectively. The primary winding of output transformer 24 is connected between points C and D, the junctions of the bridge which are in each case common to the two individual coils forming one of the coil pairs connected across the input diagonal of the bridge. The secondary winding of output transformer 24 is connected to terminals 26 and 28 to which suitable detection equipment may also be connected.

Coils 10 and 12 and coils 14 and 16 may be balanced in pairs if desired or, if it be desired to take advantage of the characteristics of the unbalanced magnetometer disclosed in the copending application referred to above, the two coils of each pair may be deliberately unbalanced by an impedance such as Z and/or Y shown in dotted lines, each pair being treated separately according to the teachings of that application. The present arrangement is likewise applicable to saturated core magnetometers and to unbalanced saturated core magnetometers. The saturating bias may be supplied by a battery through a potentiometer R, as shown in dotted lines in the drawing.

According to the present invention, magnetometer-element coils 10 and 12 are connected in such fashion that the voltage at their junction increases in one sense when a certain magnetic field is applied, while magnetometer-element coils 14 and 16 are so connected that the voltage at their junction increases in the opposite sense when the same field is applied. It will be recognized, therefore, that the output of the bridge system for a given applied field will be the sum of the changes in the instantaneous voltages at points C and D, and that this output is inherently substantially greater for a given applied field than that obtained when only one pair of magnetometer elements is employed. Accordingly, sensitivity is increased very appreciably.

It should be pointed out, however, that if the coils of the two coil pairs are to be unbalanced as suggested above, care must be used, in establishing the connections between coils for the purpose of increasing sensitivity according to the invention, to avoid certain connections which while resulting in increased sensitivity may at the same time nullify the advantages otherwise enjoyed in the use of an unbalanced magnetometer system.

It will be observed that a magnetometer system of the type proposed by the invention requires the use of twice as many magnetometer elements as the types heretofore proposed. It is pointed out, however, that one, two or four elements may be combined by mounting an appropriate number of coils on a single core, and that the bridge shown in the drawing may thus comprise a single core having four coils mounted thereon, two cores each having two coils, or four cores each having a single coil, as shown schematically in the drawing. Any of the previously used arrangements may thus be constructed using the four-element bridge construction in place of the previously used two-element bridge.

What is claimed is:

In a magnetometer system of the type including magnetically sensitive means and having exciting means associated therewith, four parallel magnetometer elements connected in parallel pairs, each pair comprising two magnetometer elements connected in series across said exciting means, the connections being such that the instantaneous voltage at the junction of the magnetometer elements forming one of the pairs increases in one sense when a magnetic field is applied while the instantaneous voltage at the corresponding junction of the other pair increases in the opposite sense when the same magnetic field is applied, and an impedance connected across one element of each pair of said magnetometer elements for unbalancing the circuit in zero magnetic field.

MAX S. RICHARDSON.

REFERENCES CITED

The following references are of record in the file of this patent:

UNITED STATES PATENTS

| Number | Name | Date |
| --- | --- | --- |
| 2,027,393 | McCreary | Jan. 14, 1936 |
| 2,053,154 | La Pierre | Sept. 1, 1936 |
| 2,082,646 | Mead | June 1, 1937 |
| 2,149,092 | Kettler | Feb. 28, 1939 |
| 2,252,059 | Barth | Aug. 12, 1941 |
| 2,374,166 | Beach | Apr. 24, 1945 |
| 2,560,132 | Schmitt | July 10, 1951 |

FOREIGN PATENTS

| Number | Country | Date |
| --- | --- | --- |
| 227,370 | Switzerland | Sept. 1, 1943 |